United States Patent
Wu

(10) Patent No.: US 8,842,235 B2
(45) Date of Patent: Sep. 23, 2014

(54) FIXING STRUCTURE AND LIQUID CRYSTAL DISPLAY DEVICE HAVING THE SAME

(75) Inventor: Ze-Xin Wu, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/509,762

(22) PCT Filed: Apr. 13, 2012

(86) PCT No.: PCT/CN2012/073979
§ 371 (c)(1),
(2), (4) Date: May 14, 2012

(87) PCT Pub. No.: WO2013/127115
PCT Pub. Date: Sep. 6, 2013

(65) Prior Publication Data
US 2013/0222729 A1    Aug. 29, 2013

(51) Int. Cl.
*G02F 1/1333* (2006.01)
(52) U.S. Cl.
USPC .......................................................... 349/58
(58) Field of Classification Search
USPC .......................................................... 349/58
See application file for complete search history.

(56) References Cited

U.S. PATENT DOCUMENTS

| | | | |
|---|---|---|---|
| 6,747,713 B1 | 6/2004 | Sato | |
| 8,008,570 B2 | 8/2011 | Han et al. | |
| 2002/0063812 A1* | 5/2002 | Natsuyama | 349/58 |
| 2007/0216825 A1* | 9/2007 | Hsu et al. | 349/58 |
| 2008/0239195 A1 | 10/2008 | Nishio et al. | |
| 2008/0239197 A1 | 10/2008 | Kasuga | |

FOREIGN PATENT DOCUMENTS

| | | |
|---|---|---|
| CN | 1153913 A | 7/1997 |
| CN | 101276077 A | 10/2008 |
| CN | 101539675 A | 9/2009 |
| JP | 2009-212056 A | 9/2009 |

* cited by examiner

*Primary Examiner* — Wen-Ying P Chen
(74) *Attorney, Agent, or Firm* — Muncy, Geissler, Olds & Lowe, P.C.

(57) ABSTRACT

Provided are a fixing structure and a liquid crystal display device. The fixing structure comprises: a front frame with a rectangle shape has four lateral sides, each lateral side includes a flat first extending part, and the four first extending part form four corners. Each corner is formed with a first mounting hole, and the first mounting hole is used for fixing the front frame from the corner by a fastening member passing through the first mounting hole The liquid crystal display device comprises a liquid crystal panel and the above fixing structure for installing the liquid crystal panel. The fixing structure and the liquid crystal display device reduce the influence of the fastening members on visible area, decrease the working hour for assemble the device, and lower the material cost.

8 Claims, 6 Drawing Sheets

FIXING STRUCTURE AND LIQUID CRYSTAL DISPLAY DEVICE HAVING THE SAME

FIELD OF THE INVENTION

The present invention relates to a liquid crystal display device, and more particularly to a fixing structure of a liquid crystal display device.

BACKGROUND

Conventional liquid crystal display device generally includes: a fixing structure including a front frame and a back cover corresponding to each other; and a liquid crystal panel installed in the fixing structure. A conventional fixing structure, as shown in FIG. 1, includes a front frame 1a and a back cover 2a, and through locking screws 4 at the front to hold the front frame 1a and the back cover together, a liquid crystal panel 3 may be secured, but the visible area of the liquid crystal panel is reduced in this kind of fixing structure. Another conventional fixing structure, as shown in FIG. 2, secures the liquid crystal panel 3 by locking screws at the lateral sides of the front frame 1a and the back cover; meanwhile, the screws are disposed inside lateral through holes 11a of the front frame 1a. This kind of structure often requires two screws in a corner, therefore increases working hour and manufacturing cost.

SUMMARY

In order to overcome the deficiencies of the prior art, the present invention is to provide a fixing structure of a liquid crystal display device, wherein the fixing structure is capable of reducing the space of visible area taken up by fastening members, and reducing assemble time and material cost.

The present invention provides a fixing structure including a rectangle front frame having four lateral sides, each lateral side includes a flat first extending part, and the four first extending parts form four corners. Each corner is formed with a first mounting hole, and the first mounting hole is used for fixing the front frame from the corner by a fastening member passing through the first mounting hole.

Each of the four sides of the front frame further includes a second extending part bent extending from the first extending part. At least a lateral side of the front frame is formed with a second mounting hole, and the second mounting hole is used for fixing the front frame from the lateral side by a fastening member passing through the second mounting hole.

Preferably, each of the second extending part of the four lateral sides of the front frame is formed with at least a second mounting hole.

The present invention further provides a liquid crystal display device including a liquid crystal panel and a fixing structure for installing the liquid crystal panel, wherein the fixing structure includes a rectangle front frame having four lateral sides, each lateral side includes a flat first extending part, and the four first extending parts form four corners. Each corner is formed with a first mounting hole, and the first mounting hole is used for fixing the front frame from the corner by a fastening member passing through the first mounting hole.

Each of the four sides of the front frame further includes a second extending part bent extending from the first extending part. At least a lateral side of the front frame is formed with a second mounting hole, and the second mounting hole is used for fixing the front frame by a fastening member passing through the second mounting hole.

Comparing with conventional technologies, the fixing structure and the liquid crystal display device according to the present invention may decrease the fastening member's influence on the visible area, and reduce assemble time and material cost.

DESCRIPTION OF THE EMBODIMENTS

Hereinafter, the preferred embodiment of the present invention will be described in detail with reference to the accompanying drawings, to describe the structure and features of the present invention.

The present invention provides a fixing structure of a liquid crystal display device. The fixing structure includes a rectangle front frame having four lateral sides, each lateral side includes a flat first extending part, and the four first extending part form four corners. Each corner is formed with a first mounting hole, and the first mounting hole is used for fixing the front frame from the corner by a fastening member passing through the first mounting hole.

The present invention further provides a liquid crystal display device including a liquid crystal panel and the aforesaid fixing structure for installing the liquid crystal panel.

Figure 1:
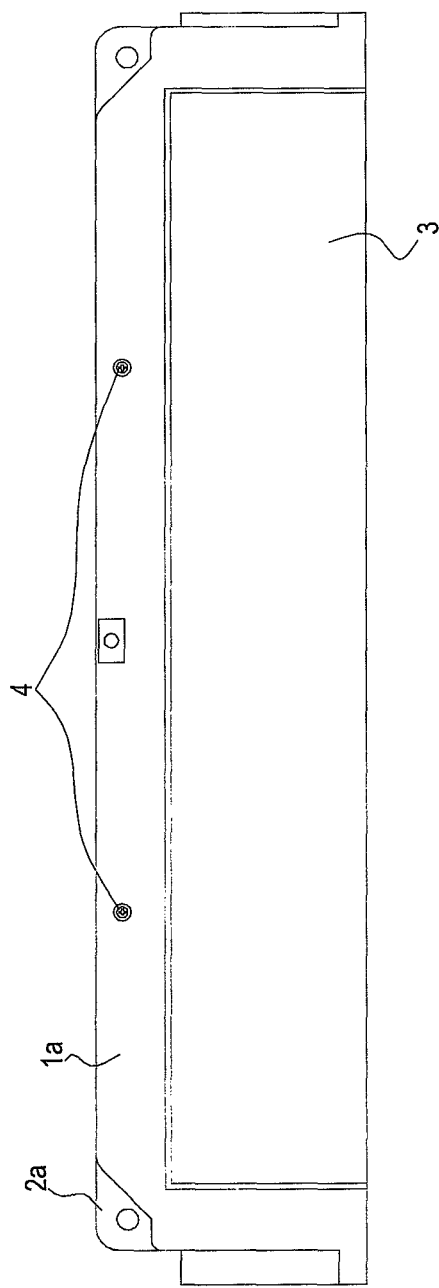
FIG. 1 is a drawing of a fixing structure of a liquid crystal display device according to prior art.
Figure 2:
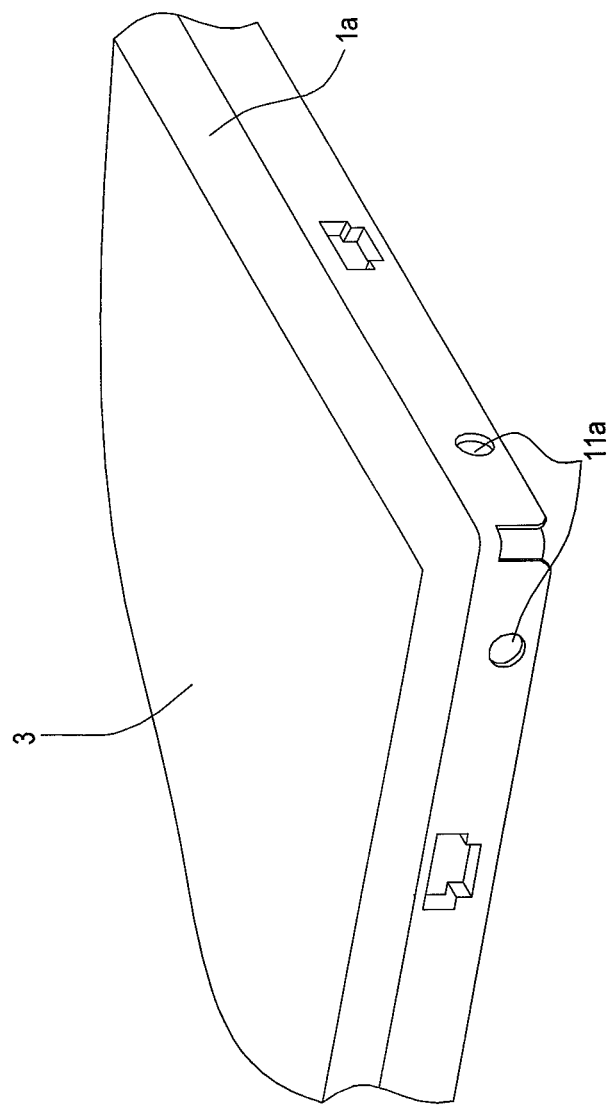
FIG. 2 is a drawing of a fixing structure of another liquid crystal display device according to prior art.
Figure 3:
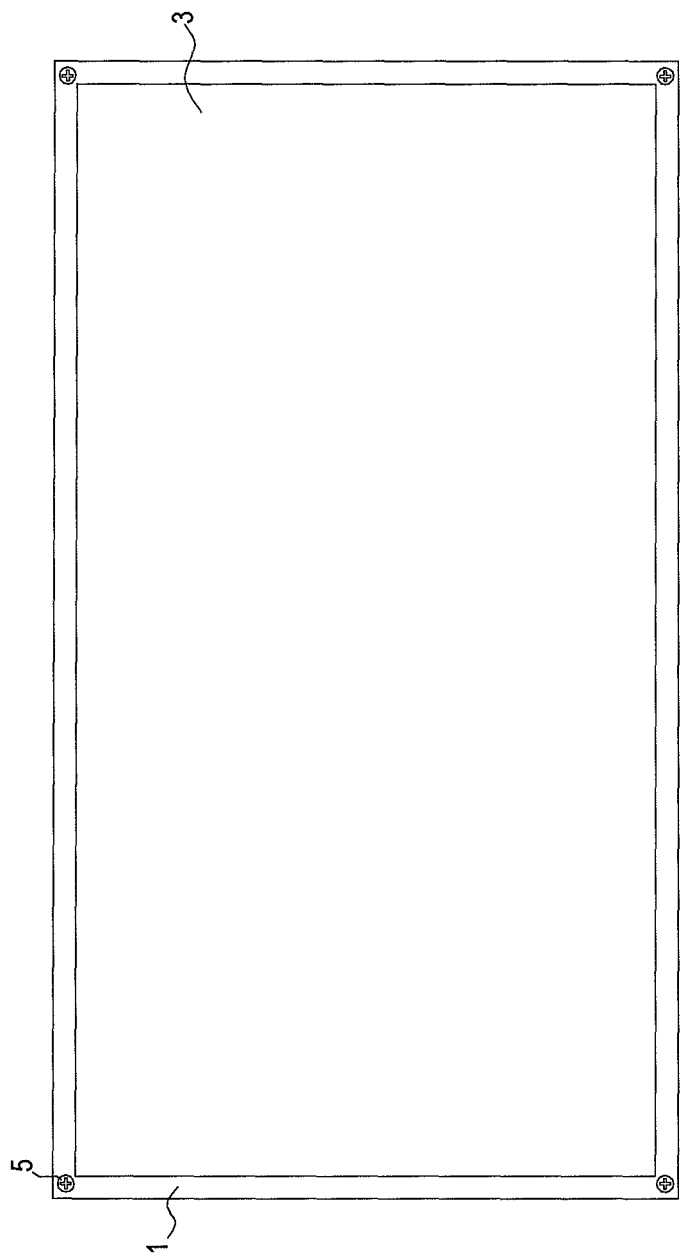
FIG. 3 is a top view of a fixing structure according to the first preferred embodiment of the present invention.
Figure 4:
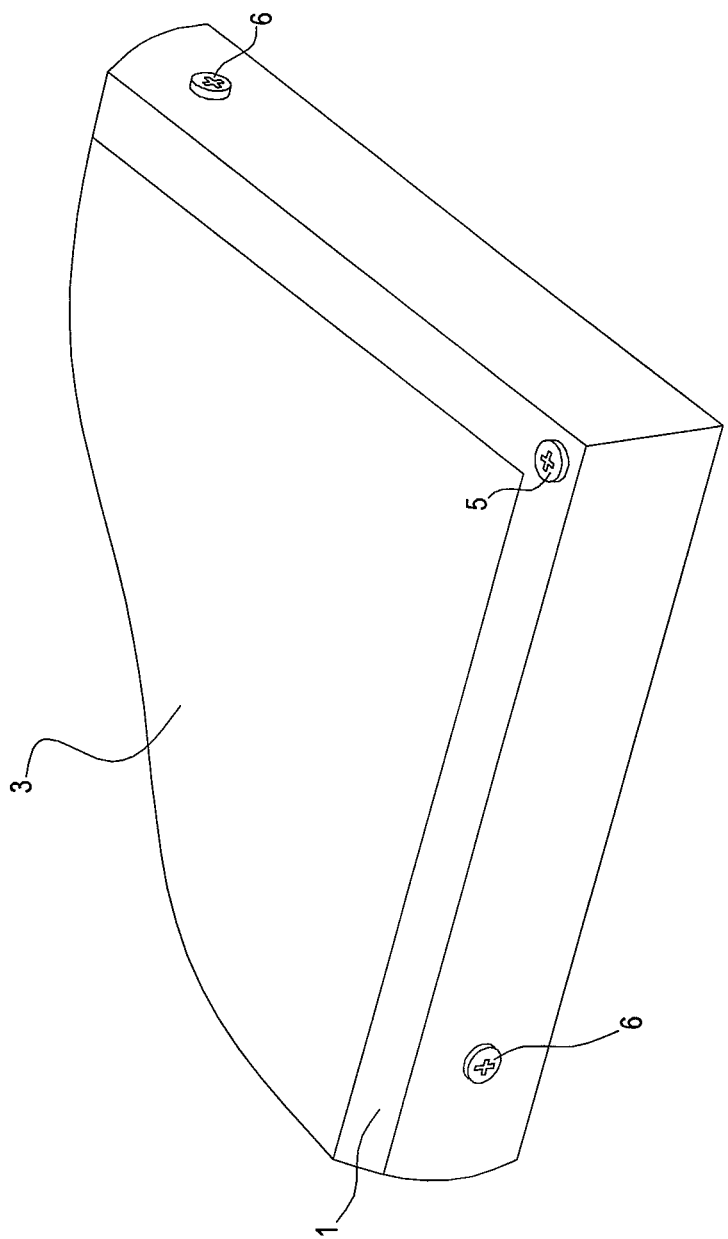
FIG. 4 is a perspective view of the corner of the fixing structure according to the first preferred embodiment of the present invention.

Referring to FIGS. 3 and 4, a fixing structure according to the first embodiment of the present invention includes a front frame 1, a back cover, and screws 5 and 6 for combining the front frame 1 and the back cover. The front frame 1 and the back cover are of rectangular shape. The front frame 1 has four lateral sides, wherein each lateral side includes a flat first extending part 12 and a second extending part 13 bent extending from the first extending part 12. The four first extending parts 12 form four corners. A first mounting hole is formed at the front of each four corners of the front frame 1, and the first mounting hole is used for fixing the front frame from the corner by a screw 5 passing through the first mounting hole Moreover, the second extending parts 13 of the four lateral sides of the front frame 1 may be formed with a plurality of second mounting holes, and the second mounting hole is used for fixing the front frame from the lateral side by a fastening member 6 passing through the second mounting hole so as to increase the fixing strength.

The front frame 1 has no chamfered edge or a smaller chamfered edge at the four corners thereof, and the first mounting holes and screw 5 are disposed directly at the corner.

The second extending parts 13 of the four lateral sides of the front frame 1 each has at least a second mounting hole, and the second mounting hole is used for fixing the front frame from the lateral surface by a screw 6 passing through the second mounting hole so as to increase the fixing strength.

The liquid crystal display device according to the first embodiment of the present invention includes a liquid crystal panel 3 and the aforesaid fixing structure for installing the liquid crystal panel 3.

Figure 5:
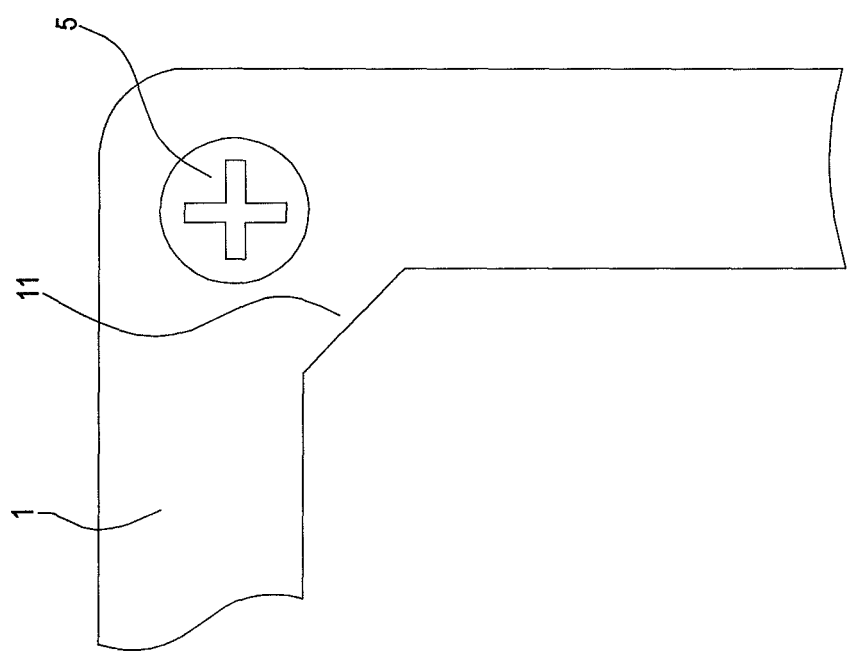
FIG. 5 is a top view of the corner of the fixing structure according to the second preferred embodiment of the present invention.
Figure 6:
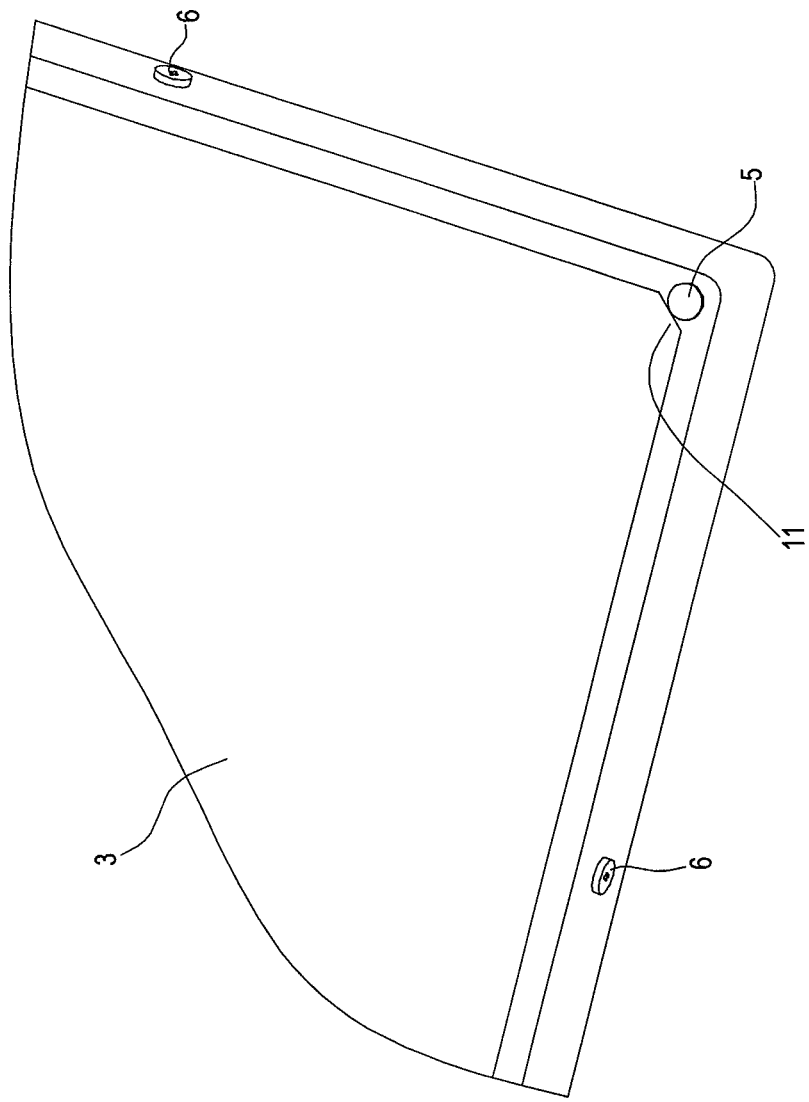
FIG. 6 is a perspective corner view of the fixing structure according to the second preferred embodiment of the present invention.

Referring to FIGS. 5 and 6, a fixing structure according to the second embodiment of the present invention is illustrated. The difference between the second embodiment and the first embodiment of the present invention is described below. Four corners of the front frame 1 and the back cover respectively include a chamfered edge 11; preferably, a corresponding chamfered edge is formed at a position of the liquid crystal panel 3 corresponding to the position of the chamfered edge 11 of the front frame 1. By providing the chamfered edge 11 at the four corners, the problem of larger chamfered edge at the four corners or smaller available space may be solved, and the screw 5 may be locked without interfering with interior components. Further, considering that the chamfered edge 11 is disposed at the corner, the influence to the visible area of the liquid crystal panel 3 may be minimized.

It is to be understood that, considering the actual application, the liquid crystal display device according to the present invention may only rely on the first mounting holes of the four corners and the screws 5 respectively passing through the first mounting holes to fix the device, or may selectively form the second mounting hole in the second extending parts 13 of one of the lateral sides, and the second mounting hole is used for fixing the front frame from the lateral side to increase fixing strength. For example, the second mounting hole and the screw 6 may be provided at two corresponding lateral sides. For example, the second mounting hole and the screw 6 may be provided at all four lateral sides. Further, the number of the screw 6 provided at the lateral sides may be one, two, three or more than three varying according to the size of the liquid crystal display device. Besides, the screw 6 and the screw 5 may be of the same or different in specifications.

Although the previous embodiments employ the front frame 1 and the back cover to fix the liquid crystal panel 3, the fixing also may be implemented by the front frame 1 and other structures such as a middle frame in another embodiment. And when the liquid crystal panel 3 is integrally formed and includes corresponding assembling-assisting structure, the front frame 1 may also combine with the liquid crystal panel 3 directly.

Although the four lateral sides of the front frame 1 according to the above-mentioned embodiments all include the flat first extending part 12 and second extending parts 13 bent extending from the first extending parts 12, they may only include the flat first extending parts 12 according to other embodiments; the phrase "flat" used herein does not place limitation that the whole lateral sides should be flat, or flatness may only be required partially, just sufficient for installing the front frame 1 on the front of the liquid crystal panel 3. In other embodiments, the four lateral sides of the front frame 1 may be structures further bent and extended from the second extending parts 13 such that the upper, lower and lateral surface of the front frame 1 may correspond to the back cover, the middle frame, or the assembling-assisting structure of the liquid crystal panel 3.

Although the screws 5 according to the above-mentioned embodiments are all disposed at the front of the liquid crystal panel 3, they may be disposed at the back of the liquid crystal panel 3. Preferably, the first mounting hole may have screw thread that matches the screws 5.

Comparing to the prior art, the fixing structure and the liquid crystal display device provided by the present invention have an advantageous effect in that by disposing the screws 5 at the front of the four corners, the screws 6 may be selectively disposed at the four lateral sides according to actual application requirement to increase fixing strength, thereby reducing the influence of the screws 5 and the screws 6 to the visible area of the liquid crystal panel 3 as much as possible, decreasing the working hour for assemble the device, and lowering the material cost.

The previous description of the preferred embodiment is provided to further describe the present invention, not intended to limit the present invention. Any modification apparent to those skilled in the art according to the disclosure within the scope, for instance, replacing the screws 5 and 6 with other fastening members such as bolts or locks, will be construed as being included in the present invention.

What is claimed is:

1. A fixing structure comprising:
a front frame, wherein the front frame with a rectangle shape has four lateral sides, each lateral side includes a flat first extending part, and the four first extending parts form four corners; each of the four corners of the front frame is formed with a first mounting hole and the first mounting hole is used for fixing the front frame from the corner by a fastening member passing through the first mounting hole; each of the four sides of the front frame further includes a second extending part bent extending from the first extending part; the second extending part of at least a lateral side of the front frame is formed with a second mounting hole and the second mounting hole is used for fixing the front frame from the lateral side by a fastening member passing through the second mounting hole; each corner of the front frame has a chamfered edge formed between the two adjacent first extending parts in a horizontal direction, and two obtuse angles are formed between the chamfered edge and the two adjacent first extending parts in the horizontal direction.

2. A fixing structure comprising:
a front frame, wherein the front frame with a rectangle shape has four lateral sides, each lateral side includes a flat first extending part, and the four first extending parts form four corners; each of the four corners of the front frame is formed with a first mounting hole and the first mounting hole is used for fixing the front frame from the corner by a fastening member passing through the first mounting hole,
wherein each corner of the front frame has a chamfered edge formed between the two adjacent first extending parts in a horizontal direction and two obtuse angles are formed between the chamfered edge and the two adjacent first extending parts in the horizontal direction.

3. The fixing structure of claim 2, wherein each of the four lateral sides of the front frame further includes a second extending part bent extending from the first extending part; the second extending part of at least a lateral side of the front frame is formed with a second mounting hole and the second mounting hole is used for fixing the front frame from the lateral side by a fastening member passing through the second mounting hole.

4. The fixing structure of claim 3, wherein each of the second extending parts of the four lateral sides of the front frame is formed with at least a second mounting hole.

5. A liquid crystal display device comprising:
a liquid crystal panel and a fixing structure for installing the liquid crystal panel, wherein the fixing structure includes a front frame, the front frame with a rectangle shape has four lateral sides, each lateral side includes a flat first extending part, and the four first extending parts form four corners; each of the four corners of the front frame is formed with a first mounting hole and the first mounting hole is used fixing the front frame from the corner by a fastening member passing through the first mounting hole, wherein the corner of the front frame has a chamfered edge.

6. The liquid crystal display of claim 5, wherein each of the four sides of the front frame of the fixing structure further includes a second extending part bent extending from the first extending part; the second extending part of at least a lateral side of the front frame is formed with a second mounting hole and the second mounting hole is used for fixing the front frame from the lateral side by a fastening member passing through the second mounting hole.

7. The liquid crystal display of claim 5, wherein a corresponding chamfered edge is formed at a position of the liquid crystal panel corresponding to the position of the chamfer of the front frame.

8. The liquid crystal display of claim 6, wherein each of the second extending parts of the four lateral sides of the front frame of the fixing structure is formed with at least a second mounting hole.

* * * * *